United States Patent
Berker

(10) Patent No.: US 9,177,376 B2
(45) Date of Patent: Nov. 3, 2015

(54) METHOD FOR DETERMINING THE DISTRIBUTION OF AN IMAGING AGENT

(71) Applicant: KONINKLIJKE PHILIPS N.V., Eindhoven (NL)

(72) Inventor: Yannick Berker, Witten (DE)

(73) Assignee: Koninklijke Philips N.V., Eindhoven (NL)

(*) Notice: Subject to any disclaimer, the term of this patent is extended or adjusted under 35 U.S.C. 154(b) by 0 days.

(21) Appl. No.: 14/420,678

(22) PCT Filed: Aug. 20, 2013

(86) PCT No.: PCT/IB2013/056754
§ 371 (c)(1),
(2) Date: Feb. 10, 2015

(87) PCT Pub. No.: WO2014/030119
PCT Pub. Date: Feb. 27, 2014

(65) Prior Publication Data
US 2015/0221083 A1 Aug. 6, 2015

Related U.S. Application Data

(60) Provisional application No. 61/691,874, filed on Aug. 22, 2012.

(30) Foreign Application Priority Data

Aug. 22, 2012 (EP) .................................. 12181291

(51) Int. Cl.
*G06K 9/00* (2006.01)
*G06T 7/00* (2006.01)
(Continued)

(52) U.S. Cl.
CPC ............ *G06T 7/0012* (2013.01); *G06K 9/6215* (2013.01); *G06T 3/00* (2013.01);
(Continued)

(58) Field of Classification Search
CPC .................. G06K 9/6215; G06T 2207/10104; G06T 3/00; G06T 7/0012; G06T 7/0081; H04N 13/0203
See application file for complete search history.

(56) References Cited

U.S. PATENT DOCUMENTS

8,078,258 B2 * 12/2011 Declerck et al. ............... 600/420
2006/0073101 A1 * 4/2006 Oldfield et al. .............. 424/9.34
(Continued)

OTHER PUBLICATIONS
Berker, Y., et al.; Activity quantification combining conjugate-view planar scintigraphies and SPECT/CT data for patient-specific 3-D dosimetry in radionuclide therapy; 2011; Eur. J. Nucl Med Mol Imaging; 38:2173-2185.
(Continued)

*Primary Examiner* — Tom Y Lu

(57) ABSTRACT

The present invention relates to a method for determining the distribution of an imaging agent in a volume. The method comprises the acquisition of at least one three-dimensional functional image of the volume; the segmentation of the volume into one or more compartments; the representation of the three-dimensional imaging agent activity from the functional image by the product of a scaling factor and a non-affine transformation of a template imaging agent activity; the calculation of a projected imaging agent activity from the thus represented imaging agent activity on a planar surface; the acquisition of a planar image of the imaging agent activity in the volume; the registration of the projected imaging agent activity with the planar image; the comparison of the acquired planar image with the calculated projected imaging agent activity; and the modification of the representation of the three-dimensional imaging agent activity.

11 Claims, 1 Drawing Sheet

(51) Int. Cl.
*G06K 9/62* (2006.01)
*G06T 3/00* (2006.01)
*H04N 13/02* (2006.01)

(52) U.S. Cl.
CPC ............ G06T 7/0016 (2013.01); G06T 7/0081 (2013.01); H04N 13/0203 (2013.01); *G06T 2207/10104* (2013.01); *G06T 2207/10108* (2013.01); *G06T 2207/10128* (2013.01); *G06T 2207/30004* (2013.01)

(56) References Cited

U.S. PATENT DOCUMENTS

| 2007/0219729 A1* | 9/2007 | Peligrad et al. ................ 702/25 |
| 2007/0299335 A1* | 12/2007 | Declerck et al. .............. 600/420 |
| 2008/0214933 A1 | 9/2008 | Von Busch et al. |
| 2011/0309255 A1 | 12/2011 | Bert et al. |

OTHER PUBLICATIONS

He, B., et al.; Comparison of conventional, model-based quantitative planar, and quantitative SPECT image processing methods for organ activity estimation using In-111 agents; 2006; Phys. Med. Biol.; 51:3967-3981.

Song, N., et al.; EQPlanar: a maximum-likelihood method for accurate organ activity estimation from whole body planar projections; 2011; Phys. Med. Biol.; 56:5503-5524.

Stabin, M. G., et al.; State of the Art in Nuclear Medicine Dose Assessment; 2008; Seminars in Nuclear Medicine; 38 (5)308-320.

* cited by examiner

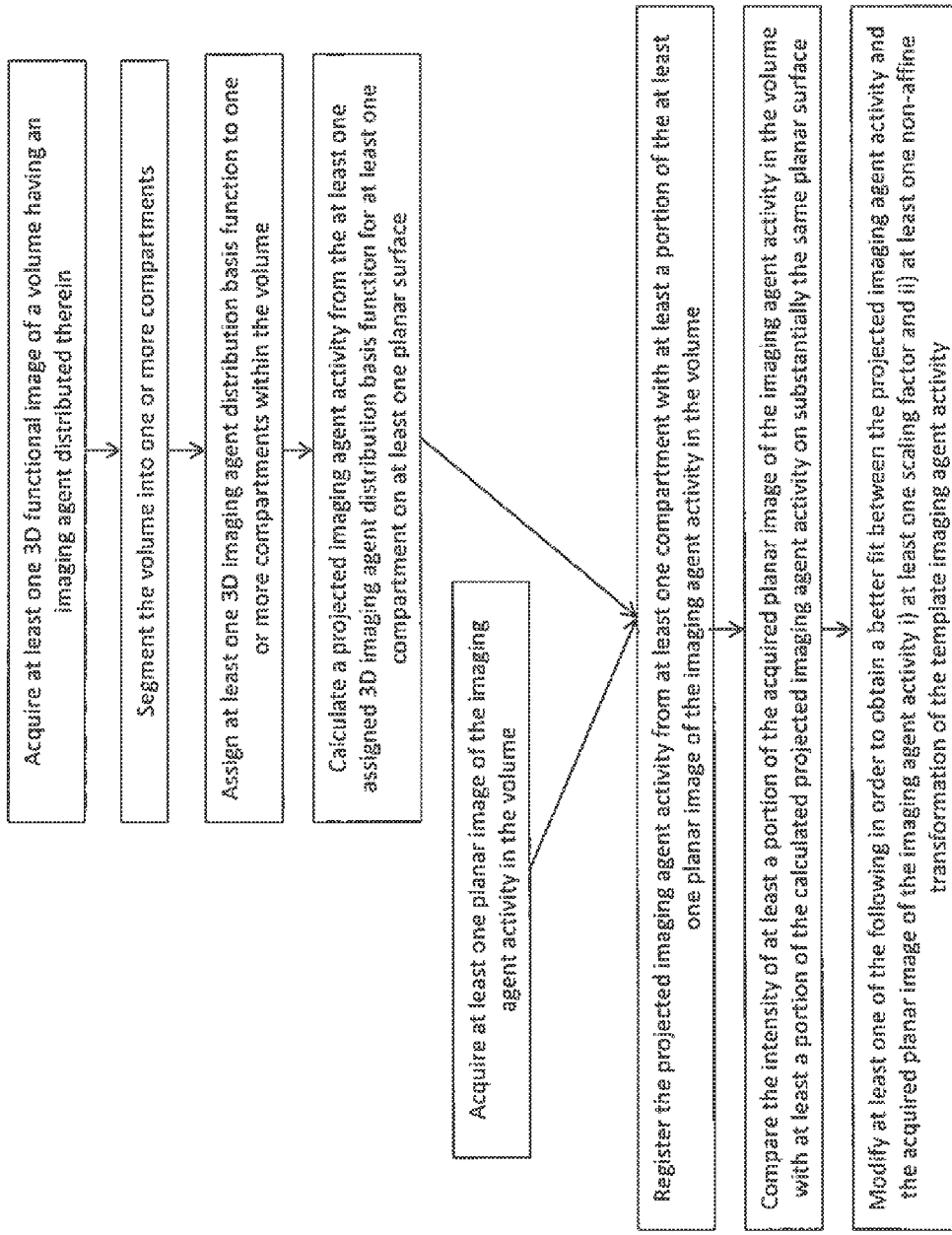

METHOD FOR DETERMINING THE DISTRIBUTION OF AN IMAGING AGENT

CROSS REFERENCE TO RELATED APPLICATIONS

This application is a national filing of PCT application Serial No. PCT/IB2013/056754, filed Aug. 20, 2013, published as WO 2014/030119 A1 on Feb. 27, 2014, which claims the benefit of U.S. provisional application Ser. No. 61/691,874 filed Aug. 22, 2012 and EP provisional application serial no. 12181291.1 filed Aug. 22, 2012, both of which are incorporated herein by reference.

FIELD OF THE INVENTION

The invention relates to a method for analysing images from medical imaging systems. More specifically the invention finds application in the field of imaging agent distribution measurement, and even more specifically the invention can be applied to measure the distribution of a radiotracer in the field of dose optimization in the delivery of targeted radiotherapy.

BACKGROUND OF THE INVENTION

In the field of medical imaging the measurement of radiotracer distributions within a body is used to indicate the functioning of various biological processes. The body may be for example a human or animal or other organism, and the radiotracer may be a chemical compound that is preferentially uptaken by particular organs in the body. In order to measure the spatial distribution of the radiotracer, tomographic imaging such as PET and SPECT is typically used, resulting in high accuracy three-dimensional images of the radiotracer. The images may further be segmented into compartments, such as organs, subsections of organs, or tumours, the images being subsequently processed to compute the total uptake within a particular compartment. In order to determine changes in the accumulation of the radiotracer over time, multiple such three-dimensional images may be generated over the course of a period of time. Subsequently such images may be used by a physician to assist in the diagnosis of a condition or in the planning of medical treatments. By computing the uptake within a compartment at different points in time the biological functioning of a particular compartment can be determined. Furthermore the radiotracer may be used in a treatment planning step wherein the activity and distribution of the radiotracer are indicative of the activity of a radioactive therapy agent that is used to target a cancer or other malignancy. By measuring the evolution of the spatial activity of the radiotracer and computing the activity for particular compartments, a time activity curve, or TAC can be generated for each compartment and the necessary dose of radioactive therapy agent that is subsequently administered to the body during a treatment step can be determined. A TAC may further be numerically integrated to yield the area under the curve. This reflects the total number of radioactive decay events in that compartment which can be used to estimate the radiation dose.

Three-dimensional imaging of the distribution of such a radiotracer using tomographic methods yields high quality images which can be used to compute low-error TACs. However this is a time consuming exercise since the patient must typically be scanned in order to build-up the three-dimensional image from multiple slices through the body. Further, such time-consuming measurements are subject to changes in activity and radiotracer distribution during the course of the measurement which leads to measurement inaccuracies.

In seeking to resolve such inadequacies, various approaches have been made to replace some of the tomographic imaging steps outlined above with planar imaging steps, also known as scintigraphies. Scintigraphies have a shorter acquisition time and require less complex and less expensive equipment, and the use of such two-dimensional imaging equipment further reduces the resource demand for three-dimensional imaging equipment. The combination of three- and two-dimensional images is then used to determine the compartment radiotracer distribution at different points in time, and may be presented for example through a TAC. In the publication "Comparison of conventional, model-based quantitative planar, and quantitative SPECT image processing methods for organ activity estimation using In-111 agents, IOP Publishing, Phys Med Biol. 51 (2006) 3967-3981", He and Frey report on a technique named QPLANAR that merges the advantages of fast 2D imaging with additional 3D imaging. In QPLANAR the authors use a three dimensional CT image and a planar scintigraphy as the starting point. A CT image is a three dimensional image describing the structure within an imaging volume and comprises a set of voxels or smaller three-dimensional volumes. In QPLANAR, the CT image serves as a three-dimensional reference structure of the body being imaged, from which the activity resulting from homogeneous compartment radiotracer activities is determined in the plane of the planar scintigraphy imaging system. The CT image is segmented into separate compartments; thus each voxel in the imaging volume is assigned to a particular compartment. The radiotracer activity in each compartment is represented by the product of a scaling factor and a normalised, homogeneous "basis function"; a three-dimensional matrix wherein each element represents the radiotracer activity of a voxel within the compartment. In QPLANAR it is assumed that each compartment has a homogeneous radiotracer activity; thus all voxels have the same radiotracer activity and consequently each compartment is described with a single basis function. Subsequently a projection model is used to determine the activity of the homogeneous compartment activity of radiotracer when projected onto a two-dimensional plane which corresponds to the position of the two-dimensional scintigraphy. Each compartment's basis function is therefore projected onto this plane to yield one projected basis function per compartment. The planar projection of the segmented compartments is then rigidly co-registered to the scintigraphy to assure spatial correspondence between the projection and the scintigraphy. Finally, initial estimates of the scaling factors in each compartment, such as an organ, are adjusted until a best fit is obtained between the measured activity or intensity in the scintigraphy and that modelled by the projected basis function. The best fit yields an approximation to the radiotracer activity in each compartment. By measuring several such scintigraphies over time and fitting the activities in each compartment at each time point, the desired compartment activity can be estimated at the time of each scintigraphy.

The QPLANAR approach was taken one stage further in the publication "EQPLANAR: a maximum likelihood method for accurate organ activity estimation from whole body planar projections. IOP Publishing, Phys. Med. Biol. 56 (2011) 5503-5524" by Song et al which allowed for compartment-independent registration. The optimisation process in this publication is formulated such that it not only finds the most likely homogeneous organ-independent activities, but also the most likely organ shifts which may have occurred between the acquisition of the CT image and the planar scintigraphy.

The QPLANAR approach was taken one stage closer to clinical application in the publication "Activity quantification combining conjugate-view planar scintigraphies and SPECT/CT data for patient-specific 3-D dosimetry in radionuclide therapy. Eur. J. Nucl. Med. Mol. Imaging. 2011 Dec. 38 (12) 2173-2185" in which Berker et al use a three dimensional CT image, two planar conjugate-view scintigraphies, and a three dimensional SPECT image as the starting point. The three dimensional SPECT image is acquired from a point in time after the same radiotracer measured in the scintigraphies is administered, and offers a better estimate of the shape of the radiotracer distribution within each compartment. Rather than describing the activity within each compartment as being homogeneous, thus as one basis function wherein all voxels have the same radiotracer activity, each compartment is described by two scaling factors and two basis functions. One basis function represents a homogeneous background voxel radiotracer activity and the other represents a spatially-varying voxel radiotracer activity. The first basis function is equivalent to the single basis function in QPLANAR. This way, each compartment is described by the same set of voxels in which the total activity of any one voxel is determined by the linear sum of a homogeneous voxel activity and the spatially-varying voxel activity. The spatially varying voxel activity represented by the second basis function is derived from the SPECT image which has been acquired from a point in time after the administration of the radiotracer. The SPECT-derived voxel activity represented by the second basis function is normalised to that of the assumed homogeneous activity represented by the first basis function. For each compartment, independent scaling factors are assigned to each basis function and the radiotracer activity distribution within any compartment at any point in time can be estimated by adjusting each of the scaling factors. Each basis function is subsequently projected onto each of the two two-dimensional planes corresponding to the positions of the two-dimensional conjugate view scintigraphies. This results in two projected basis functions per compartment for each of the two scintigraphies. The two projected basis functions per compartment are then rigidly co-registered to their corresponding scintigraphy to assure spatial correspondence between the projection and the scintigraphy. Finally the scaling factors for both the homogeneous radiotracer activity, and for the spatially-varying radiotracer activity are adjusted until a best fit is obtained between the sum of the projected basis functions and the measured scintigraphy. The best fit again yields an approximation to the radiotracer activity in each compartment. By measuring several such scintigraphies over time and fitting the projected activities from each compartment, the desired compartment radiotracer activities can be estimated at the time of each scintigraphy. In so doing a more accurate representation of the activity distribution within the compartment yields more accurate fitted scaling factors and thus a more accurate estimate of the radiotracer activity within each compartment.

However the aforementioned solutions still suffer from the drawback of inaccurately fitting the radiotracer activity within each particular compartment. Consequently they result in a poor estimate of the activity as a function of time in each which can lead to a physician making an imperfect diagnosis or further to poor accuracy in calculating the necessary dose of radioactive therapy agent that is subsequently administered to the body during a radiotherapy treatment stage.

SUMMARY OF THE INVENTION

It is an object of the invention to provide an improved, faster and more accurate method for determining the activity of an imaging agent such as a radiotracer within the imaging region of an imaging system. It is a further object of the invention to provide a more accurate method for determining the required dose of therapy agent that is subsequently administered to a body during a treatment stage. Other objects of the invention include the provision of an imaging protocol with reduced throughput time, and the use of less complex imaging systems than are currently employed.

This object is achieved as claimed in claim 1 by the use of the method in which additional and improved imaging agent distribution basis functions that better approximate the actual activity distribution during the progression of imaging agent uptake in the body are assigned to compartments within the volume of interest. The imaging agent distribution basis functions comprise a representation of the three-dimensional imaging agent activity in each compartment by the product of a scaling factor and a non-affine transformation of a template imaging agent activity wherein the template imaging agent activity is determined from a three-dimensional functional image of the volume. The accuracy of determining the activity of an imaging agent within the imaging region of an imaging system, and the accuracy of a therapy agent calculation made in accordance with the invention are both improved through the use of this new representation. A reduction of processing time and thus improved patient throughput is achieved through the use of this model which provides a better fit with a measured planar image of the imaging agent activity. Further improvements in the accuracy of calculating the necessary dose of a therapy agent made in accordance with the invention, and a reduction in processing time result from improvements to the segmentation of the three-dimensional functional image into compartments.

The improved method of claim 1 originates from the realization that the accumulation of an imaging agent such as a radiotracer within particular regions of an organ occurs at surprisingly elevated rates at certain points in time. During the initial phase immediately after the imaging agent has been administered to the body the uptake can be relatively uniform within a particular organ yielding a more or less homogeneous imaging agent distribution. Toward the final imaging stages the imaging agent activity typically decays to a more or less homogeneous activity. However during the uptake phase the imaging agent has been found to accumulate at elevated rates at particular regions within an organ. This may be at a particular tumour site, or in a particular region within a tumour. At other positions within particular organs the uptake has been found to be particularly slow. Thus the assumptions of a homogeneous imaging agent compartment distribution made in previous approaches to model the imaging agent distribution such as such as QPLANAR and EQPLANAR restrict the accuracy of these approaches. Likewise, imaging agent distribution basis functions as determined from a three-dimensional functional image and held constant for all scintigraphies may inadequately represent the inhomogeneous uptake. By contrast the representation of the three-dimensional imaging agent activity in each compartment by the product of a scaling factor and a non-affine transformation of a template imaging agent activity wherein the template imaging agent activity is determined from a three-dimensional functional image of the volume in the present invention can be used to either accentuate or suppress the modelled projected imaging agent activity at particular voxels within the imaging region that are associated with a high activity or a low activity respectively in the functional image without prior knowledge about particular sites of increased or decreased uptake. The choice of appropriate non-affine activity transformations can be made depending on the patient and the disease state, separately for each organ, for each time-point, and for each two-dimensional plane, to increase the likelihood between the projected imaging agent activity and the measured imaging agent activity. Consequently a better fit is obtained between the projected imaging agent activity and the measured activity on a planar surface such as a scintigraphy, and an improved estimate of the activity within a compartment can be made.

According to a first aspect of the invention a method for determining the distribution of an imaging agent in a volume is provided, the method comprising: acquiring at least one three-dimensional functional image of the volume having an imaging agent distributed therein; segmenting the volume into one or more compartments; assigning at least one three-dimensional imaging agent distribution basis function to one or more compartments within the volume; calculating a projected imaging agent activity from the at least one assigned three dimensional imaging agent distribution basis function for at least one compartment on at least one planar surface; acquiring at least one planar image of the imaging agent activity in the volume; registering the projected imaging agent activity from at least one compartment with at least a portion of the at least one planar image of the imaging agent activity in the volume; comparing the intensity of at least a portion of the acquired planar image of the imaging agent activity in the volume with at least a portion of the calculated projected imaging agent activity on substantially the same planar surface; characterised in that: the three dimensional imaging agent distribution basis function comprises a representation of the three-dimensional imaging agent activity by the product of a scaling factor and a non-affine transformation of a template imaging agent activity wherein the template imaging agent activity is determined from at least a portion of the three-dimensional functional image of the volume; and further characterised in that at least one of the following is modified: i) at least one scaling factor and ii) at least one non-affine transformation of the template imaging agent activity. Consequent to the improved representation of the three-dimensional imaging agent distribution, the accuracy of determining the imaging agent distribution within the imaging region of an imaging system and the accuracy of therapy agent calculation made in accordance with the determined distribution are both improved.

According to a second aspect of the invention the non-affine transformation of the template imaging agent activity is at least one of the group: piecewise-constant, second power, third power, fourth power, polynomial, exponential, square root, cube root and fourth root. These activity transformations can be advantageously used to accentuate and to de-emphasise particular regions of the modelled volume and thereby yield a better fit to the acquired planar image.

According to a third aspect of the invention the three dimensional imaging agent distribution basis function assigned to one or more compartments of the volume further includes a representation of the three-dimensional imaging agent activity by the product of a further scaling factor and an affine transformation of a template imaging agent activity wherein the template imaging agent activity is determined from at least a portion of the three-dimensional functional image of the volume. Whilst affine transformations of the template imaging agent activity alone have been found to inadequately model the projected imaging agent activity and thus yield a poor fit to a measured planar image, the inclusion of an affine transformation with a non-affine transformation can act to improve the fit obtained. By including an affine imaging agent activity transformation the model more accurately takes account of regions within a compartment which have a more homogeneous uptake. By modelling such regions with a comparatively simpler mathematical operation than the non-affine imaging agent activity transformation a faster convergence of the model is obtained.

According to a fourth aspect of the invention the three-dimensional functional image is acquired at a later point in time to the at least one planar image. For example the three dimensional functional image may be acquired some minutes, hours, days or weeks after the planar image. Thus the fitting process in which the template representation of the three dimensional functional image is fitted to the one or more previously-acquired planar images, may take place after the acquisition of the three dimensional functional image. Such post-processing of the data is advantageous particularly when studies take place over extended periods of time and the resources for the fitting process are not easily integrated into the imaging workflow. Immediately after the administering of the imaging agent to the body there is little uptake and thus a functional image typically shows relatively homogeneous activity. By acquiring the functional image at a later point in time than the planar image, the functional image measures the distribution of the imaging agent after it has accumulated at particular sites such as organs or tumours within the body. Thus the functional image acquired from a later point in time better represents the actual distribution of the imaging agent and serves as a better starting point for the fitting of the projected imaging agent distribution to the measured planar image.

According to a fifth aspect of the invention a second three-dimensional functional image is further acquired at a different point in time to the first functional image. The second functional image is processed according to the steps of the first aspect of the invention in order to project a second imaging agent activity distribution basis function onto the plane of a measured planar image and thereby obtain a second set of fitting parameters between the measured planar image and the second projected imaging agent activity distribution. The second functional image, since it originates from a different point in time, can provide a better template distribution for the imaging agent distribution at the time of its acquisition and thus yield a more accurate estimate of the imaging agent distribution.

According to a sixth aspect of the invention at least a second planar image of the imaging agent activity in the volume is further provided. The second planar and further planar images may be co-planar with the first image, or have a different orientation with respect to the volume as compared to the first image. The fitting parameters for the second and further projected imaging agent activities may, when compared to those from the first projected imaging agent activity, be computed for example by calculating their difference or their least squares difference to provide a validation parameter indicative of the quality of the fit obtained.

According to a seventh aspect of the invention the plane of the at least a second planar image is substantially parallel to the plane of the first planar image and the planes of the first and the at least a second planar images are on opposite sides of the volume. Termed conjugate-view planar scintigraphies in the case of their acquisition using a gamma camera, the fitting parameters for the first and second and further respective projected imaging agent activity distributions may be used provide a validation parameter indicative of the quality of the fit obtained.

According to an eighth aspect of the invention a computer storage device encoded with a program configured to carry out the method of the first aspect of the invention is provided; a computer storage device being more suited and faster than manual operations for carrying out these computational procedures.

According to a ninth aspect of the invention the method according to the first aspect of the invention is used in the creation of a therapeutic treatment plan. Prior to the commencement of a therapeutic treatment plan it can be beneficial to know the spatial and time activity distribution of the therapy agent in order to determine the administration dose. Thus the administration dose and therapy agent's spatial and time distribution can be used to predict the desired- and side-effects in the patient. By using a pair of imaging and therapy agents which have a similar distribution in a body, the spatial and time activity distribution of the imaging agent can be used to predict that of the therapeutic agent. Therefore, in a treatment planning step, a low dose of the imaging agent is typically administered to the patient and its distribution determined. Alternatively, in a retrospective study, the effect of an on-going treatment can be estimated in an analogous way. This is possible if the therapeutic agent can also be used for imaging. By using the method of the present invention to more accurately determine the distribution of the imaging agent in a compartment within the body, a more accurate determination of the treatment dose necessary in the therapy stage is provided.

According to a tenth aspect of the invention the therapeutic treatment plan according to the ninth aspect of the invention is a targeted radiotherapy treatment plan. In targeted radiotherapy of cancer and other malignancies, a patient is administered radioactive therapy agents that are linked to targeting molecules, which in turn are intended to bind to the site of malignancy. The aim of administering radioactive agents in this way is to kill malignant cells in the body by the nuclear particles and the radiation emitted during radioactive decay while saving healthy cells. The major determinant for effects and side effects of this treatment is the local energy deposition, the energy dose, measured in Gray, which is mainly determined by the distribution of the radioactivity in the body over time. This is in turn is determined by the distribution of the targeting molecule and the amount of administered activity, measured in Giga-Becquerels. The imaging agent is linked to the same targeting molecule as the therapy agent later used in the treatment; a retrospective study is possible if the therapy agent can also be used for imaging, which is the case with for example $^{131}$I or $^{90}$Y.

According to an eleventh aspect of the invention the imaging agent used in the method according to the first aspect is a radiotracer; the functional image is a PET image or a SPECT image; and the planar image is acquired using a gamma camera which is well adapted to the measurement of the radiation emitted by a radiotracer. Such a planar image acquired in this way is typically termed a scintigraphy.

BRIEF DESCRIPTION OF THE FIGURES

FIG. 1 illustrates an example of the method steps used to implement the group of imaging agent distribution basis functions of the present invention.

DETAILED DESCRIPTION OF THE INVENTION

In order to provide a more accurate and faster method for determining the distribution of an imaging agent such as a radiotracer within a volume, at least one improved three-dimensional imaging agent distribution basis function is assigned to one or more compartments within the volume. The three dimensional imaging agent distribution basis function comprises the representation of a three-dimensional imaging agent activity in the volume by the product of a scaling factor and a non-affine transformation of a template imaging agent activity wherein the template imaging agent activity is determined from a three-dimensional functional image of the volume. The group of activity transformations known as non-affine transformations have been found to better represent the activity resulting from large spatial variations in imaging agent uptake within voxels comprising the imaging region of an imaging system and which have been found to occur during particularly the rapid uptake phase following the administration of an imaging agent to a body. When the imaging agent activity is represented in this way and projected onto the plane of a detector measuring a planar image, an improved fit has been found to occur between the measured planar image and the projected template imaging agent activity. The template distribution of the imaging agent is provided by a three-dimensional functional image which has been acquired after the administration of the imaging agent. The template imaging agent distribution can be considered to represent a typical distribution of the imaging agent after its uptake in that body has begun. The activity resulting from this template distribution is thus represented by transforming the activity at each voxel in the template with a non-affine transformation, and projecting this activity onto the plane of the planar imaging system in order for a comparison with the acquired planar image data to be made.

The group of transformations known as non-affine transformations are applied to the template imaging agent activity in the present invention. Affine transformations of the parameter q which represents for example the voxel intensity, or the activity of an imaging agent at that voxel are represented by the function:

$$F(q)=m \cdot q+b \qquad \text{Equation 1}$$

wherein m and b are constants. Thus non-affine transformations include all non-linear functions of the parameter q, for example power laws, including for example second, third and fourth powers and so on, square roots, cube roots and so on, polynomials, exponentials and logarithms, and non-continuous functions such as ones defined piecewise. These non-linear transformations of the activity act to accentuate, in the case of for example a square power law, and to de-emphasise, in the case for example of a square root power law, the importance of the activity of particular voxels on the resulting activity when projected onto the plane of the planar image. This is particularly important when regions of high and low activity appear adjacent to one another, for example in regions local to a tumour site. The activity resulting from such regions is poorly modelled by combinations of affine activity transformations.

FIG. 1 illustrates an example of the method steps used to implement the group of imaging agent distribution basis functions of the present invention. Whilst having particular application in the field of radiotracer distribution measurement, the method of the invention is also applicable to the broad field of imaging agent distribution measurement, which in addition to radiotracer measurement includes for example measuring the distributions of: fluorescence imaging agents for fluorescence molecular tomography; magnetic nano-particles such as in magnetic particle imaging, radioactive tracers such as those used in PET, SPECT, and scintigraphies; radiopharmaceuticals, including those which are used for therapy and offer imaging possibilities in addition such as $^{131}$I or $^{90}$Y; X-Nuclei for "X-nuclei MRI" such as $^{11}$C, $^{17}$O, $^{19}$F, $^{23}$Na; ultrasound imaging agents such as microbubbles; X-ray Imaging agents such as those based on Iodine; and proton-MRI contrast agents including for example gadolinium-based contrast agents.

According to step 1 in FIG. 1, a three dimensional functional image is acquired of a volume within the imaging region of a functional imaging system. A portion of a body having an imaging agent administered thereto is positioned in the imaging region of the functional imaging system, which may be for example a PET or a SPECT imaging system. The imaging agent may be a radiotracer, for example Fluorodeoxyglucose (FDG), $^{67}$Ga, $^{111}$In, $^{123}$I, $^{124}$I, $^{131}$I, $^{90}$Y, $^{99m}$Tc, $^{201}$Tl; the body may be for example a human, an animal or other organism. An uptake period may be allowed to lapse prior to the positioning of the body in the imaging system or alternatively the imaging agent may be administered to the body whilst the body is within the imaging region of the imaging system. The functional image C, given by C(x,y,z), represents the imaging agent activity of a voxel having spatial position defined by the indices x,y,z within the imaging region.

According to step 2 in FIG. 1, the volume is segmented into one or more compartments. Segmentation is the delineation of particular regions of interest in three-dimensional space. The volume is segmented such that each voxel belongs to only one compartment. The volume includes a portion of the body being imaged, and the compartments, may be organs such as a heart, lungs or the liver in the body, or subsections of such organs such as a ventricle within the heart, or for example a tumour or a region within a tumour. The segmentation may be performed manually by an operator, for example through interaction with a visual display unit, or may be performed automatically wherein analytical software identifies features bounding the different compartments and subsequently assigns each voxel to a compartment. Such features may include those common in medical image segmentation, such as image intensity, image intensity gradients, image texture, etc, as well as the result of step 7 in FIG. 1 if the invention is applied iteratively. As a result of a comparison between measured planar images and projected imaging agent activity distribution basis functions, the segmentation may be further refined, for example if the comparison yields regions of good agreement as well as regions of poor agreement. Alternatively the segmentation may be coarsened if the comparison yields implausibly high deviations between measured planar images and projected imaging agent activity distribution basis functions. The segmentation may be refined by splitting compartments into one or more sub-compartments, which are in the following treated as separate compartments. Coarsening the segmentation can be achieved by for example combining one or more compartments. As an example, using a combination of refinement and coarsening, a compartment can be decreased in size by splitting it into a central region and a rim region by means of morphological filtering. The rim region can subsequently be combined with surrounding regions. Likewise, it can be increased in size. This allows, for example, taking into account size variations of compartments between measurements, such as in the case of tumours shrinking under therapy. The segmentation into n segments can be represented by the matrices $S_n$ given by $S_n(x,y,z)$ which is 1 if the voxel at spatial position x,y,z belongs to segment n, and 0 otherwise.

According to step 3 in FIG. 1, at least one three-dimensional imaging agent distribution basis function is assigned to one or more compartment within the volume. Specifically, the three dimensional imaging agent activity within at least one compartment is represented by the product of a scaling factor and a non-affine transformation of a template imaging agent activity in that compartment, wherein the template imaging agent activity in that compartment is determined from at least a portion of the three dimensional functional image of the volume. An example of the assignment of basis function B to a compartment n defined by segmentation matrix $S_n(x,y,z)$ is given in Equation 2 in the specific case of basis function (m=1) in which for which the desired activity transformation of the three-dimensional template imaging agent distribution is a square power law. Thus in Equation 2 the three dimensional template imaging agent activity represented by C(x,y,z) which is determined from the functional image of the volume, is masked by the segmentation matrix $S_n(x,y,z)$ in order to define the matrix elements in C(x,y,z) which are then transformed by the square power law, the result being multiplied by the scaling factor k of compartment n for this basis function m=1.

$$B_{n,m=1}(x,y,z) = k_{n,m=1} \cdot (C(x,y,z) * S_n(x,y,z))^2 \qquad \text{Equation 2}$$

In Equation 2, $k_{n,m}$ is a linear scaling factor associated with each compartment n and each basis function m. There may be one compartment, or alternatively more compartments in the volume, and there may be one three-dimensional imaging agent distribution basis function, or alternatively more than one three-dimensional imaging agent distribution basis function assigned to a compartment. The number of three-dimensional imaging agent distribution basis functions assigned to the compartments does not have to identical. In the event that there is more than one three-dimensional imaging agent distribution basis function, the three-dimensional imaging agent distribution basis functions may have different scaling factors $k_{n,m}$, and different non-affine activity transformations may be applied to different compartments; thus for example the second compartment may be assigned a cubic activity transformation, being different to that assigned to the first compartment.

According to step 4 in FIG. 1 a projected imaging agent activity from the at least one three-dimensional imaging agent distribution basis function is calculated on at least one planar surface. In the example of a radiotracer the activity is defined as the number of decay events per unit time, being typically measured in Becquerels and thus the projected activity may be calculated in Becquerels. The activity can also be normalized to the voxel volume or a unit volume and for example be measured in Becquerels per ml, or normalized to the homogeneous distribution of the administered dose in a patient's body and measured in units of SUV (standardized uptake value). In the broader field of imaging agent distribution determination the activity is more generally expressed as the number of molecules contributing to the detected imaging intensity per unit volume or "agent concentration". If there is more than one three-dimensional imaging agent distribution basis function then the three-dimensional imaging agent distribution basis functions are projected separately onto the planar surface. Equation 3 depicts the projection of the transformed imaging agent activity onto an arbitrarily-defined x,y plane which yields the activity that would be detected by a planar detector on that plane. The projection can be onto any planar surface and would typically be parallel to the axis of the imaging system. In the example of radiotracer measurements this is the plane in which a scintigraphy is typically obtained.

$$PB_{n,m}(x,z) \triangleq \text{Projection}(B_{n,m}(x,y,z)) \qquad \text{Equation 3}$$

The projection function in Equation 3 includes all necessary physical effects, such as, but not limited to, in the case of nuclear imaging, photon attenuation, photon scatter, detector noise, or detector blurring. In the example of nuclear imaging, this may require additional information about the camera, the contrast agent or the patient, such as in the form of camera geometry or attenuation maps derived from CT images.

According to step 5 in FIG. 1 at least one planar image is acquired of the imaging agent activity from the volume. In the example of measuring the activity from a radiotracer, the planar image is typically termed a scintigraphy, and the plane of each of the at least one planar images is typically substantially parallel to the axis of the imaging system. A scintigraphy is typically acquired using a gamma camera.

According to step 6 in FIG. 1 the projected compartment imaging agent activity that was calculated by projecting the one or more basis functions at step 4 is registered with the planar image acquired in step 5. Returning to the example of radiotracer measurement, the compartment radiotracer activity basis function that was projected onto the planar surface at step 4, is registered with the planar image of the contrast agent activity in the volume. Registration may be rigid or non-rigid and serves to ensure optimal spatial correspondence between the measured planar image and the projected activity from each compartment.

According to step 7 in FIG. 1; the intensity of the acquired planar image of the imaging agent activity in the volume is compared with the calculated projected imaging agent activity on the same planar surface in order to determine the degree of correspondence. The degree of correspondence may be compared by for example computing the least squares difference between either a part of or the whole of the set of data points represented in the two images. In the example of radiotracer measurement, the intensity of the planar image represents the radioactive activity detected at that point.

According to step 8 in FIG. 1 at least one of the following is modified i) at least one scaling factor and ii) at least one non-affine transformation of the template imaging agent activity. By modifying at least one scaling factor from the group $k_{n,m}$ a better fit between the projected compartment imaging agent activity and the acquired imaging agent activity in the volume may be obtained, wherein modifying is take to mean changing the value thereof. Likewise a better fit may be obtained by modifying the non-affine transformation, such as by choosing a different transformation from the non-affine group to transform the template activity in one or more compartments.

Optionally steps 2, 3, 4 and 6, 7, 8 in FIG. 1 are repeated so as to obtain better correspondence. Furthermore, the segmentation of the imaging volume into compartments may be modified by for example assigning different voxels to different compartments in order to obtain better correspondence between the calculated projected imaging agent activity and the intensity of the acquired planar image of the imaging agent activity.

Whilst described in a stepwise format having a logical order of processing the data, the steps in FIG. 1 need not be performed in this order since these operations are typically applied after the acquisition of the images. For example the acquisition of the planar image in step 5 may be carried out prior to the acquisition of the three dimensional functional image of the volume in step 1.

In a first embodiment of the invention the imaging agent activity in a compartment is represented by a single non-affine transformation of the template imaging agent activity as determined from a functional image of the volume. Thus taking for example Equation 2 above, the activity resulting from the imaging agent distribution basis function in the first compartment (n=1) can be represented by the matrix:

$$B_{1,1}(x,y,z) = k_{1,1} \cdot (C(x,y,z) * S_1(x,y,z))^2 \qquad \text{Equation 4}$$

for the exemplary case where the non-affine activity transformation of a square power law is used and $k_{1,1}$ is a scaling factor associated with compartment 1 and the imaging agent distribution basis function 1.

In a second embodiment of the invention the imaging agent activity in a compartment is represented by the combination of a non-affine transformation and an affine transformation of the template imaging agent activity as determined from a functional image of the volume. Thus taking for example Equation 2 above, the activity resulting from the imaging agent distribution in the first compartment (n=1) may be represented by the matrix:

$$T_1 = k_{1,1} \cdot (C(x,y,z) * S_1(x,y,z))^2 + k_{1,2} \cdot (C(x,y,z) * S_1(x,y,z)) + k_{1,3} * S_1(x,y,z) \qquad \text{Equation 5}$$

for the exemplary case where the non-affine activity transformation of a square power law is used and wherein $k_{1,1}$, $k_{1,2}$, $k_{1,3}$ are scaling factors associated with compartment 1. The scaling factors in either embodiment may be adjusted independently in order to improve the correspondence between the calculated projected imaging agent activity and the intensity of the acquired planar image or scintigraphy. This second embodiment is well suited to fitting to the planar image when a locally high uptake of imaging agent exists within a homogeneous background uptake of imaging agent.

To summarise, a method for determining the distribution of an imaging agent in a volume is provided. The method comprises the acquisition of at least one three-dimensional functional image of the volume; the segmentation of the volume into one or more compartments; the representation of the three-dimensional imaging agent activity by the product of a scaling factor and a non-affine transformation of a template imaging agent activity from the functional image; the calculation of a projected imaging agent activity from the thus represented imaging agent activity on a planar surface; the acquisition of a planar image of the imaging agent activity in the volume; the registration of the projected imaging agent activity with the planar image; the comparison of the acquired planar image with the calculated projected imaging agent activity; and the modification of the representation of the three-dimensional imaging agent activity. Consequent to the improved representation of the three-dimensional imaging agent distribution, the accuracy of determining the imaging agent distribution within the imaging region of an imaging system is improved.

Whilst the invention has been illustrated and described in detail in the drawings and foregoing description, such illustrations and description are to be considered illustrative or exemplary and not restrictive; the invention is not limited to the disclosed embodiments and can be used for various methods for determining the activity of an imaging agent within the imaging region of an imaging system.

The invention claimed is:

1. A method for determining the distribution of an imaging agent in a volume comprising the steps of:
   acquiring at least one three-dimensional functional image of the volume having an imaging agent distributed therein;
   segmenting the volume into one or more compartments;
   assigning at least one three-dimensional imaging agent distribution basis function to one or more compartments within the volume;

calculating a projected imagine agent activity from the at least one assigned three dimensional imaging agent distribution basis function for at least one compartment on at least one planar surface;

acquiring at least one planar image of the imaging agent activity in the volume;

registering the projected imaging agent activity from at least one compartment with at least a portion of the at least one planar image of the imaging agent activity in the volume;

comparing the intensity of at least a portion of the acquired planar image of the imaging agent activity in the volume with at least a portion of the calculated projected imaging agent activity on substantially the same planar surface;

wherein:

the three dimensional imaging agent distribution basis function comprises a representation of the three-dimensional imaging agent activity by the product of a scaling factor and a non-affine transformation of a template imaging agent activity wherein the template imaging agent activity is determined from the three-dimensional functional image of the volume;

wherein following the step of comparing the intensity, at least one of the following is modified in order to obtain a better fit between the projected imaging agent activity and the acquired planar image of the imaging agent activity:

i) at least one scaling factor and ii) at least one non-affine transformation of the template imaging agent activity.

2. The method according to claim 1 wherein the non-affine transformation of the template imaging agent activity is at least one of the group: piecewise-constant, second power, third power, fourth power, polynomial, exponential, square root, cube root and fourth root.

3. The method according to claim 1 wherein the three dimensional imaging agent distribution basis function further includes a representation of the three-dimensional imaging agent activity by the product of a further scaling factor and ara affine transformation of a template imaging agent activity wherein the template imaging agent activity is determined from the three-dimensional functional image of the volume.

4. The method according to claim 1 wherein the three-dimensional functional image is acquired at a later point in time to the at least one planar image.

5. The method according to claim 1 further comprising the acquisition of a second three-dimensional functional image of the volume at a different point in time to the first three-dimensional functional image; the second functional image being processed according to the method of:

segmenting the volume defined by the second three-dimensional functional image into one or more compartments;

assigning at least one three-dimensional imaging agent distribution basis function to one or more compartments within the second three-dimensional functional image;

wherein the three dimensional imaging agent distribution basis function assigned to the second three-dimensional functional image comprises a representation of the three-dimensional imaging agent activity by the product of a scaling factor and a non-affine transformation of a template imaging agent activity wherein the template imaging agent activity is determined from the second three-dimensional functional image of the volume;

calculating a projected imaging agent activity from the at least one assigned three dimensional imaging agent distribution basis function for at least one compartment of the second three-dimensional functional image on at least one planar surface;

registering the projected imaging agent activity from at least one compartment of the second three-dimensional functional image with at least a portion of the at least one planar image of the imaging agent activity in the volume;

comparing the intensity of at least a portion of the acquired planar image of the imaging agent activity in the volume with at least a portion of the calculated projected imaging agent activity from the second three-dimensional functional image on substantially the same planar surface;

modifying at least one of the following:

i) at least one scaling factor and ii) at least one non-affine transformation of the template imaging agent activity assigned to the second three-dimensional functional image.

6. The method according to claim 1 further comprising acquiring at least a second planar image of the imaging agent activity in the volume.

7. The method according to claim 6 wherein the plane of the at least a second planar image is substantially parallel to the plane of the first planar image and the planes of the first and the at least a second planar images are on opposite sides of the volume.

8. The method according to claim 1 wherein the imaging agent is a radiotracer; the functional image is a PET image or a SPECT image; and the planar image is acquired using a gamma camera.

9. A computer storage device encoded with a program configured to carry out the method of claim 1.

10. The use of the method according to claim 1 in the creation of a therapeutic treatment plan.

11. The use of the method according to claim 10 wherein the therapeutic treatment plan is a targeted radiotherapy treatment plan.

* * * * *